358-86. OR 3,801,735 SR

United States Patent [19]

Gabriel

[11] 3,801,735

[45] Apr. 2, 1974

[54] WIRED BROADCASTING SYSTEMS

[75] Inventor: Ralph Parton Gabriel, Chobham, England

[73] Assignee: Communications Patents Limited, London, England

[22] Filed: Nov. 12, 1971

[21] Appl. No.: 198,220

[30] Foreign Application Priority Data

Nov. 12, 1970 Great Britain .................... 53940/70

[52] U.S. Cl. ............ 178/5.1, 325/308, 178/DIG. 13

[51] Int. Cl. ............................................ H04n 1/44

[58] Field of Search .......... 178/5.1; 174/DIG. 13, 1, 174/9; 325/31, 308; 179/2 TV, 18 BH, 90 BD, 1.5 S, 1.5 F, 1.5 C, 1.5 M

[56] References Cited

UNITED STATES PATENTS

| | | | |
|---|---|---|---|
| 3,665,311 | 5/1972 | Gargini | 178/DIG. 13 |
| 3,190,965 | 6/1965 | Zarouni | 179/18 BH |
| 3,529,100 | 10/1966 | Jacobs | 179/90 BD |
| 3,668,307 | 6/1972 | Face et al. | 325/308 |
| 3,366,731 | 1/1968 | Wallerstein | 178/5.1 X |
| 2,823,264 | 2/1958 | Pharis | 179/90 BD |

FOREIGN PATENTS OR APPLICATIONS

| | | | |
|---|---|---|---|
| 1,940,497 | 2/1970 | Germany | 178/DIG. 13 |

*Primary Examiner*—Maynard R. Wilbur
*Assistant Examiner*—S. C. Buczinski
*Attorney, Agent, or Firm*—Laurence R. Brown

[57] ABSTRACT

A wired broadcasting system operates with several transmitting program sources and a program exchange which couples a subscriber's twisted pair cable connection to a selected one of the sources. A separate set of control signal conductors enable the subscriber to select either a program source or another subscriber's station.

1 Claim, 2 Drawing Figures

T5003

WIRED BROADCASTING SYSTEMS

Figures 1, 2:
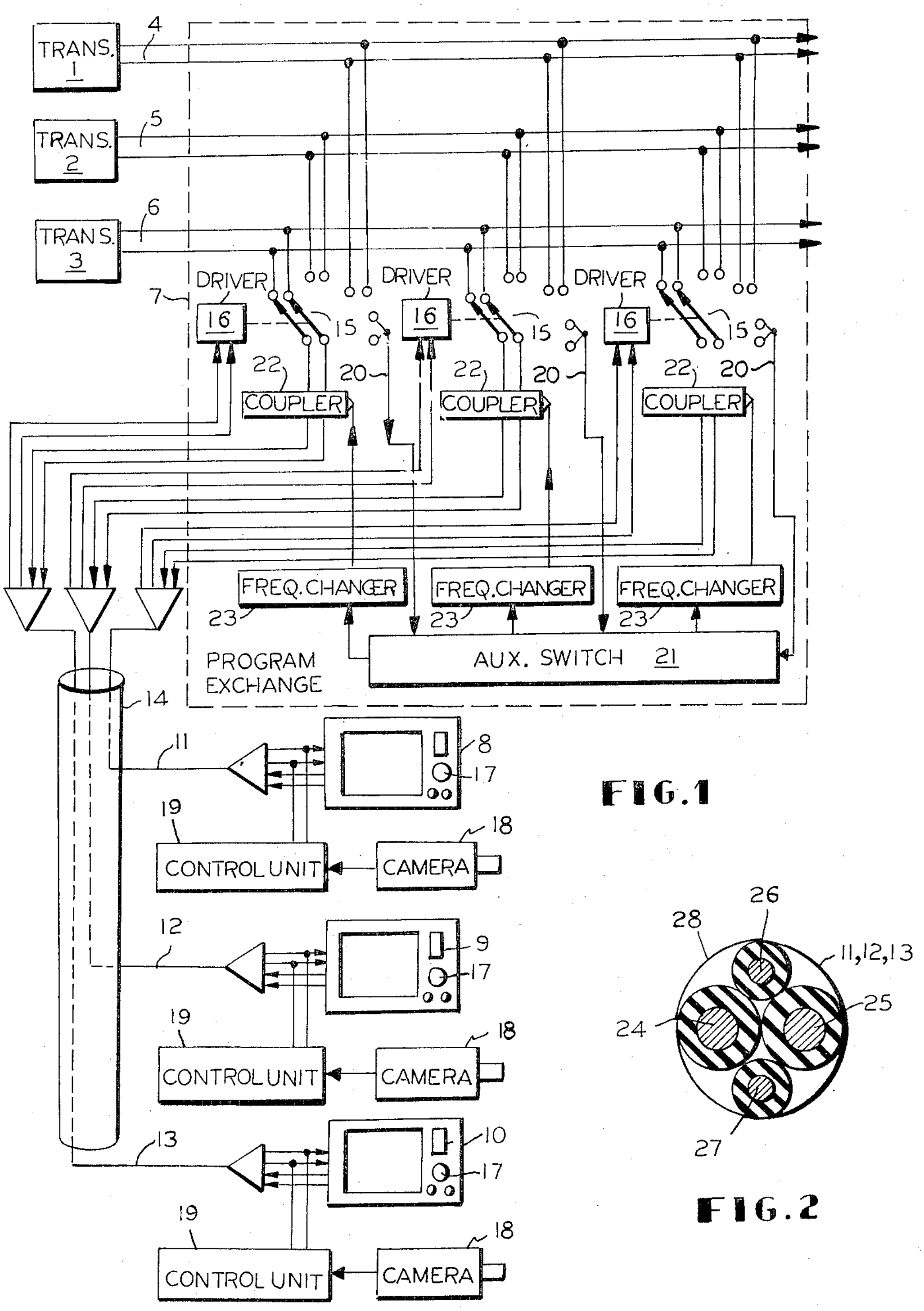

This invention relates to wired broadcasting systems and seeks to provide an improved form thereof. The present invention is particularly applicable to wired broadcasting systems of the kind referred to in U.S. Pat. Ser. No. 848,567, filed Aug. 8, 1969, U.S. Pat. No. 3,693,090 issued Sept. 19, 1972.

In accordance with the present invention there is provided a wired broadcasting system which comprises a plurality of transmitting equipments each in respect of a different broadcasting programme and having a conductive path between each of said plurality of transmitting equipments and a programme exchange, a programme selection device in the programme exchange for connecting a subscriber's feeder to at least some of said conductive paths thereby to be effective to derive programme signals therefrom and a subscriber's feeder extending between the programme exchange and a subscriber's terminal unit, the subscriber's feeder comprising a pair of twisted together signal conductors for conveying programme signals between the programme exchange and the subscriber's terminal unit, said signal conductors forming between them a pair of interstices in each of which is located a corresponding one of a pair of control conductors for conveying control signals between the subscriber's terminal unit and the programme selection device in the programme exchange in which there is provided an auxiliary switching means whereby a subscriber is enabled to establish a signal connection between his signal conductors and the signal conductors pertaining to a different subscriber.

In an arrangement according to the present invention the programme selection device may be arranged to be controlled to select a condition which provides access from the signal conductors of an associated subscriber's feeder to the auxiliary switching means. Access from said auxiliary switching means to the signal conductors of a subscriber's feeder may be arranged to be available irrespective of the connection established by said subscriber's programme selection device by the provision of signal coupling means whereby signals emanating from the auxiliary switching means may be applied to the signal conductors of a subscriber's feeder at a location between the associated programme selection device and terminal equipment. If desired access control means may be associated with the auxiliary switching means to enable a determination to be made as to whether or not a subscriber's feeder, to which connection is desired, is already in use for other purposes, for example, the reception of television signals from the programme exchange, and to prevent the establishment of such connection in the event of such prior use.

In order that the invention may be more readily understood one particular embodiment thereof will now be described by way of example only with reference to the accompanying drawing in which FIG. 1 is a block schematic diagram of a wired broadcasting system in accordance with the present invention. FIG. 2 is a cross section view of a cable.

In the wired broadcasting system shown in the drawing, three transmitting equipments, 1, 2, 3, are each connected to a corresponding conductive path 4, 5, 6, which comprises a pair of conductors and extends between the transmitting equipment and a programme exchange 7, which may be one of several in the wired broadcasting system. The programme exchange shown in the drawing is arranged to provide for the connection of three subscribers to the conductive paths, 4, 5, 6. In practice a programme exchange may serve for the connection of, for example, one thousand or more subscribers, and provide a large number of programmes, for example, 10 to 30 or more programmes. Extending between the programme exchange and each of the three subscriber's terminal units, 8, 9, 10, is a subscriber's feeder 11, 12, 13. Each subscriber's feeder comprises a twisted together pair of insulated signal conductors which are suitable for the transmission of high frequency signals, for example, in the frequency range of 4 to 11 MHz, in respect of television signals and in respect of sound signals at audio frequency, these sound signals being either the sound accompaniment of the television programme of a sound programme. These conductors form between them a pair of interstices in which are located corresponding ones of a pair of control conductors. Such conductors are heretofore known and are shown in the hereinbefore mentioned application, wherein the high frequency conductors 24, 25 form between them the interstices in which conductors 26, 27 lie, as shown in FIG. 2. Preferably, these conductors are insulated and have an overall diameter not greater than two thirds that of the signal conductors so as to be contained within the circumscribing cylinder 28 defined by the signal conductors. Three subscriber's feeders 11, 12, 13, are combined together in a common cable 14 which extends from the programme exchange to the most remote subscriber's terminal unit 10, and passes adjacent the less remote subscriber's terminal units 8 and 9. The subscriber's feeder pertaining to each subscriber is terminated at the location of each subscriber's terminal unit as required.

Although only three subscriber's feeders are, for clarity, shown in the common cable 14, at least six and preferably 42 or more subscriber's feeders would in practice be housed within a common cable as mentioned previously. A suitable practical arrangement of such a common cable has six pairs of subscriber's feeders, each comprising a pair of signal conductors and an associated pair of control conductors arranged in the interstices found between these signal conductors, laid up around a core element formed, for example, by a string of insulating material such as polythene. Seven such cables, laid up six around one and arranged with a common housing would contain 42 subscriber's feeders.

In the programme exchange 7, there is arranged in respect of each subscriber's feeder a programme selection device 15 by means of which the signal conductors of the subscriber's feeder may be connected to a desired one of the conductive paths 4, 5, and 6. The programme selection device 15 is arranged to be positioned by means of a driving arrangement 16, which may for example, comprise an electromagnetic operating solenoid which is controlled individually by each subscriber over the control conductors. Each subscriber's terminal unit 8, 9, 10 may be provided with a programme selection switch 17 by means of which various potentials or other forms of control signal may be applied to the control conductors at the subscriber's terminal unit for actuating the respective driving arrangement 16.

In addition each subscriber's installation is provided with means for originating a television and/or sound programme by means, for example, of a camera 18 and an associated control unit 19 the output signals from which are applied to the signal conductors. In order to allow simultaneous transmission and reception of television signals over the single pair of signal conductors signals provided by the control unit 19 are arranged to occupy the frequency band differing from that of the television signals available from the programme exchange 7.

In order to enable a subscriber to establish a signal connection between his signal conductors and the signal conductors of a different subscriber each programme selection device 15 is provided with a position at which the subscriber's signal conductors may be applied over a line 20 to an auxiliary switching means 21. The auxiliary switching means 21 may comprise a plurality of electromagnetic switching devices or, preferably, a semi-conductor switching matrix. In either case the signal path through the switching means 21 may be determined by means of switching signals generated by the subscriber's control unit 19 and applied to the auxiliary switching means, for example, over the paths 20.

In order that access to a subscriber's signal conductors may be obtained at any time required signals from the auxiliary switching means 21 may be applied through a coupling means 22 formed by, for example, a hybrid transformer, between the programme selection device 15 and the corresponding subscriber's terminal unit. As the vision signals passing from the subscriber's installation to the programme exchange will occupy a frequency band different from vision signals passing in the opposite direction the signals relating to a subscriber originated transmission will require frequency translation and to this end outgoing signals from the auxiliary switching means 21 are passed through a frequency changing device 23 prior to their application to the coupling means 22.

It may be desirable to provide access control means associated with the auxiliary switching means 21 so as to enable a determination to be made as to whether or not a subscriber's signal conductors, to which connection from another subscriber's signal conductors is required, as already in use for example for receiving the television signal available from the programme exchange 7 and for preventing, in that event, the establishment of such connection so as to avoid interruption of the television programme. In some circumstances it may further be desirable to provide means for overriding this control so that a subscriber is enabled to receive vision signals of an urgent nature.

Details of suitable means for effecting subscriber originated programmes will be found in application U.S. Pat. Ser. No. 42,773, filed June 2, 1970, U.S. Pat. No. 3,665,311 issued May 23, 1972.

What we claim is:

1. A wired broadcasting system which comprises in combination, a plurality of subscribers each having a terminal receiving unit and a terminal subscriber transmission unit connected to a feeder conductor, a plurality of program transmitting equipments each providing a different broadcasting program, a program exchange connected with each subscriber feeder conductor, individual conductors connecting each program transmitting equipment to said program exchange, a program selection device in the program exchange adapted for connecting a subscriber's feeder to at least some of said individual conductors thereby to be effective to derive program signals therefrom, the subscriber's feeder conductor comprising a pair of twisted together signal conductors for conveying program signals between the program exchange and the subscriber's terminal unit, said signal conductors forming between them a pair of interstices in each of which is located a corresponding one of a pair of control conductors for conveying control signals between the subscriber's terminal unit and the program selection device in the program exchange, coupler means in the program exchange coupled between the program selection device and the terminal equipment of each subscriber for transmitting a subscriber transmission to a subscriber feeder conductor irrespective of which program is connected to the subscriber's feeder conductor, auxiliary switching means in the program exchange enabling a subscriber to establish a signal connection between his coupler means and the transmission unit of a different subscriber and control means coupled by said signal conductors to said auxiliary switching means thereby to establish a selected said signal connection to a subscriber transmission unit.

* * * * *